(12) United States Patent
Choure et al.

(10) Patent No.: US 12,210,855 B2
(45) Date of Patent: Jan. 28, 2025

(54) METHOD AND APPARATUS FOR RENDERING DYNAMIC USER INTERFACES

(71) Applicant: Rakuten Symphony, Inc., Tokyo (JP)

(72) Inventors: Vipul Choure, Indore (IN); Renu Rathod, Indore (IN); Hariprapanna Mishra, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/767,552

(22) PCT Filed: Mar. 8, 2022

(86) PCT No.: PCT/US2022/019221
§ 371 (c)(1),
(2) Date: Apr. 8, 2022

(87) PCT Pub. No.: WO2023/172245
PCT Pub. Date: Sep. 14, 2023

(65) Prior Publication Data
US 2024/0078094 A1  Mar. 7, 2024

(51) Int. Cl.
*G06F 9/44* (2018.01)
*G06F 8/34* (2018.01)
*G06F 8/38* (2018.01)

(52) U.S. Cl.
CPC . *G06F 8/38* (2013.01); *G06F 8/34* (2013.01)

(58) Field of Classification Search
CPC .................................. G06F 8/38; G06F 8/34
See application file for complete search history.

(56) References Cited

U.S. PATENT DOCUMENTS

| | | | |
|---|---|---|---|
| 2014/0245196 A1* | 8/2014 | Zheng | G06F 8/38 715/762 |
| 2018/0239507 A1 | 8/2018 | Bui et al. | |
| 2020/0125336 A1* | 4/2020 | Mills | G06F 8/35 |
| 2023/0143922 A1* | 5/2023 | Cosareanu | G05B 19/0426 718/107 |

* cited by examiner

*Primary Examiner* — Chuck O Kendall
(74) *Attorney, Agent, or Firm* — Sughrue Mion, PLLC

(57) ABSTRACT

This disclosure provides methods, apparatuses, and computer-readable mediums for rendering a dynamic user interface (UI). In an aspect, a method comprises obtaining a plurality of resources of an entity, and presenting the plurality of resources to a user. The method further comprises receiving, from the user, at least one request to include one or more resources of the plurality of resources in a UI view. The method further comprises creating, based on the at least one request from the user, a UI configuration of the UI view. The UI configuration comprises view information, in a JavaScript Object Notation (JSON) format, of the one or more resources of the plurality of resources to be included in the UI view. The method further comprises generating an identifier for the UI view, associating the identifier of the UI view with the entity, and storing the UI configuration in a database.

20 Claims, 13 Drawing Sheets

METHOD AND APPARATUS FOR RENDERING DYNAMIC USER INTERFACES

TECHNICAL FIELD

The present disclosure relates to user interface (UI) design and creation, and particularly to methods and apparatuses for creating and/or rendering dynamic UIs.

BACKGROUND

Conventionally, design, development, and deployment of user interface (UI) forms (or views) may require a lengthy process involving a large team of people. For example, such a process may include discussing and/or obtaining approval of requirements for the UI forms from a business administration (BA) team and/or a technical team. Once the requirements for the UI forms have been approved, development of the UI forms may need to wait until such development may be scheduled. That is, development may need to wait for a development team to become available and/or for a new development cycle (e.g., a sprint in an agile development methodology) to begin. The development team may take a significant amount of time to develop the UI forms, and development may also include additional time for a quality assurance (QA) team to test and/or validate the functionality of the UI forms against the requirements. The UI forms may be deployed after the development and testing cycles have been completed.

However, requirements for the UI forms may have changed during the development and testing cycle from the initial set of requirements. For example, the UI forms may require additional and/or different input parameters when compared to the initial requirements. In another example, input validation for one or more input parameters may have changed. As such, the development and testing cycles may be further elongated to accommodate the requirement changes, further delaying deployment of the UI forms.

Thus, there exists a need for improvements in the design, development, and deployment of UI forms. In particular, there is a need for methods and apparatuses for creating and/or rendering dynamic UIs by a user. Improvements are presented herein. These improvements may also be applicable to the creation and deployment of other types of UI.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for creating and/or rendering dynamic user interfaces (UIs) are disclosed by the present disclosure.

According to embodiments, a method of rendering a dynamic UI by an apparatus includes obtaining a plurality of resources of an entity. The plurality of resources includes parameter-level information. The method further includes presenting the plurality of resources to a user. The method further includes receiving, from the user, at least one request to include one or more resources of the plurality of resources in a UI view. The method further includes creating, based on the at least one request from the user, a UI configuration of the UI view. The UI configuration includes view information, in a JavaScript Object Notation (JSON) format, of the one or more resources of the plurality of resources to be included in the UI view. The method further includes generating an identifier for the UI view. The method further includes associating the identifier of the UI view with the entity. The method further includes storing the UI configuration in a database.

According to embodiments, an apparatus for rendering a dynamic UI includes a memory storage storing computer-executable instructions, and a processor communicatively coupled to the memory storage. The processor is configured to execute the computer-executable instructions and cause the apparatus to obtain a plurality of resources of an entity. The plurality of resources includes parameter-level information. The computer-executable instructions, when executed by the processor, further cause the apparatus to present the plurality of resources to a user. The computer-executable instructions, when executed by the processor, further cause the apparatus to receive, from the user, at least one request to include one or more resources of the plurality of resources in a UI view. The computer-executable instructions, when executed by the processor, further cause the apparatus to create, based on the at least one request from the user, a UI configuration of the UI view. The UI configuration includes view information, in a JSON format, of the one or more resources of the plurality of resources to be included in the UI view. The computer-executable instructions, when executed by the processor, further cause the apparatus to generate an identifier for the UI view. The computer-executable instructions, when executed by the processor, further cause the apparatus to associate the identifier of the UI view with the entity. The computer-executable instructions, when executed by the processor, further cause the apparatus to store the UI configuration in a database.

According to embodiments, a non-transitory computer-readable medium includes computer-executable instructions for rendering a dynamic UI by an apparatus. The computer-executable instructions, when executed by at least one processor of the apparatus, cause the apparatus to obtain a plurality of resources of an entity. The plurality of resources includes parameter-level information. The computer-executable instructions, when executed by at least one processor of the apparatus, further cause the apparatus to present the plurality of resources to a user. The computer-executable instructions, when executed by at least one processor of the apparatus, further cause the apparatus to receive, from the user, at least one request to include one or more resources of the plurality of resources in a UI view. The computer-executable instructions, when executed by at least one processor of the apparatus, further cause the apparatus to create, based on the at least one request from the user, a UI configuration of the UI view. The UI configuration includes view information, in a JSON format, of the one or more resources of the plurality of resources to be included in the UI view. The computer-executable instructions, when executed by at least one processor of the apparatus, further cause the apparatus to generate an identifier for the UI view. The computer-executable instructions, when executed by at least one processor of the apparatus, further cause the apparatus to associate the identifier of the UI view with the entity. The computer-executable instructions, when executed by at least one processor of the apparatus, further cause the apparatus to store the UI configuration in a database.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 7 is an example of a third user interface for creating a UI view, in accordance with various embodiments of the present disclosure;

FIG. 8 is an example of a preview of a UI view, in accordance with various embodiments of the present disclosure;

FIG. 9 is an example of a first user interface for editing a UI view, in accordance with various embodiments of the present disclosure;

FIG. 11 is an example of a preview of an updated UI view, in accordance with various embodiments of the present disclosure;

DETAILED DESCRIPTION

Figure 1:
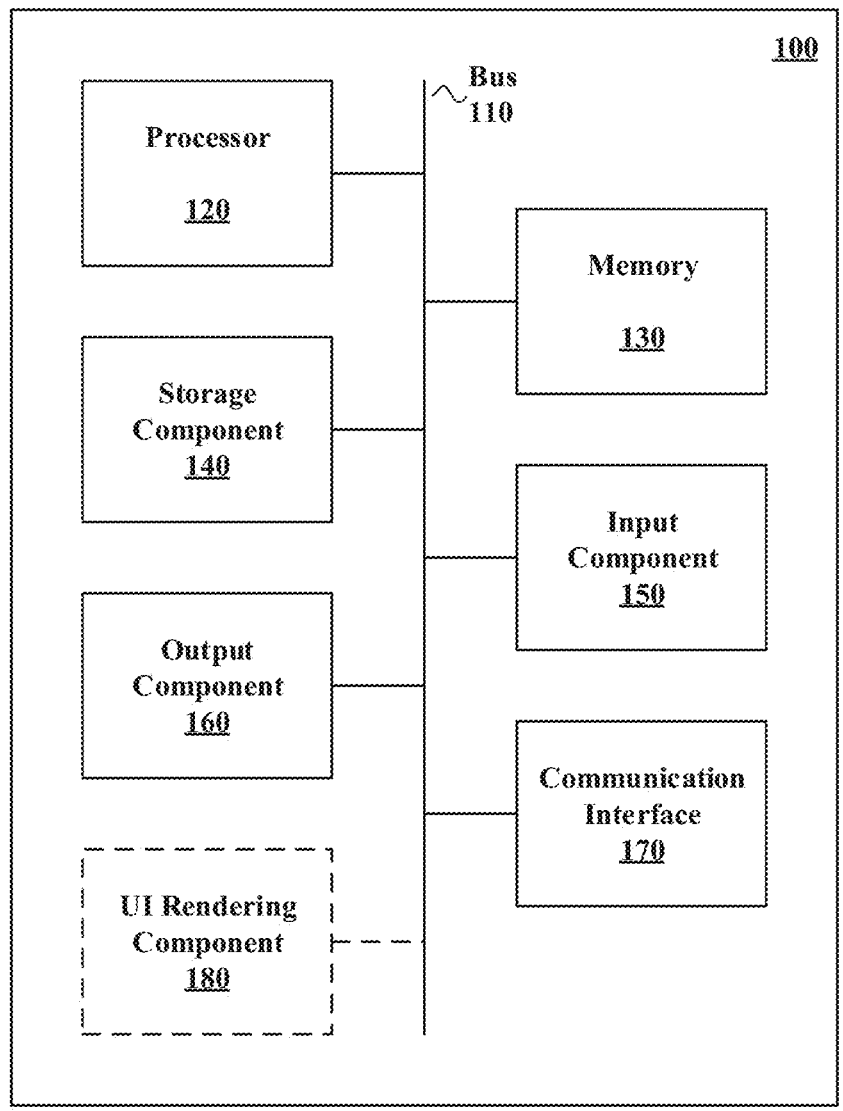
FIG. 1 is a diagram of an example device for creating and/or rendering dynamic user interfaces (UIs), in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Conventional processes for the design, development, and deployment of user interface (UI) forms (or views) may be lengthy and/or involve a large team of people. For example, requirements for the UI forms may need to be discussed with and/or approved by a business administration (BA) team and/or a technical team. Alternatively or additionally, development of the UI forms may need to wait for a development team to become available and/or for a new development cycle (e.g., a sprint in an agile development methodology) to begin. In another example, deployment of the UI forms may not occur until a development team has developed the UI forms and/or a quality assurance (QA) team has validated the functionality of the UI forms against the requirements.

Consequently, requirements for the UI forms may have changed from the initial set of requirements prior to the completion of the conventional development and deployment process. For example, the UI forms may require additional and/or different input parameters when compared to the initial requirements. In another example, input validation (e.g., a maximum number of text characters, a valid range of numeric values) for one or more input parameters may have changed. In yet another example, an input field may change from being mandatory (e.g., a corresponding value is required to be entered) to being optional (e.g., a corresponding value is not required to be entered). As such, the conventional development and testing cycles may be further elongated to accommodate the requirement changes, further delaying deployment of the UI forms.

Example embodiments of the present disclosure provide methods and apparatuses for creating and/or rendering dynamic UIs. The dynamic UIs may include one or more resources that a user has selected from a plurality of resources. Example embodiments of the present disclosure may further provide for adding resources, deleting resources, and/or modifying resources of the dynamic UIs by the user. Further, example embodiments presented herein may reduce a time required to deploy a UI form, and decrease a number of people required to deploy the UI form.

FIG. 1 is diagram of an example device for designing datacenter facilities. Device 100 may correspond to any type of known computer, server, or data processing device. For example, the device 100 may comprise a processor, a personal computer (PC), a printed circuit board comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a UI rendering component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the UI rendering component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G)

network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

In some embodiments, the device 100 may comprise the UI rendering component 180 configured to create and/or render dynamic UIs. For example, the UI rendering component 180 may be configured to obtain a plurality of resources of an entity, present the plurality of resources to a user, receive at least one request to include one or more resources of the plurality of resources in a UI view, create a UI configuration of the UI view, generate an identifier for the UI view, associate the identifier of the UI view with the entity, and store the UI configuration in a database.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

In some embodiments, a UI form (or view) may comprise one or more resources (e.g., input fields, input parameters) for obtaining information needed to accomplish an entity (e.g., a task, a workflow), such as, but not limited to a form (e.g., a registration form), an order ticket (e.g., a meal order at a restaurant), a work order (e.g., an installation work order at a facility), and the like. For example, a UI form (or view) for a patient registration task at a hospital may include patient information resources such as, but not limited to, name information resources (e.g., first name, last name, title, suffix), identification information resources (e.g., physical address, gender, age, height, weight), billing information resources (e.g., medical insurance information, credit card information), and the like. In another example, a UI form (or view) for a work order for installing a point of interface (POI) at a general datacenter (GDC) may include site information resources such as, but not limited to, a site name, site coordinates, geographical location (e.g., latitude, longitude), project name, and the like.

Alternatively or additionally, a workflow may execute one or more tasks (or entities) to accomplish a particular operation. For example, a patient registration workflow may execute a single entity (or task) associated with a single UI view to obtain patient information from a patient registering at a hospital. In another example, a patient registration workflow may execute a plurality of entities (or tasks) associated with respective UI views to obtain name information, identification information, and billing information from the patient registering at the hospital. That is, a first entity associated with a first UI view may obtain name information from the patient, a second entity associated with a second UI view may obtain identification information from the patient, and a third entity associated with a third UI view may obtain billing information from the patient.

Conventionally, the UI form (or view) may be hard-coded based on approved requirements determined at the start of the development of the UI form. That is, the resource configuration of a hard-coded UI form may not change after the hard-coded UI form has been deployed. For example, if or when the requirements of the hard-coded UI form change (e.g., a resource is added, a resource is deleted, a resource is changed from required to optional, a resource validation is changed) after the hard-coded UI form has been deployed, a new hard-coded UI form may need to be approved, developed, tested, and deployed to incorporate the updated requirements. In some instances, the development of the UI form may be extended to incorporate additional and/or modified requirements prior to the deployment of the hard-coded UI form.

Aspects presented herein provide for the creation and/or rendering of dynamic UI forms that may be created and/or modified by a user using common graphical interface operations (e.g., "drag-and-drop" operations and the like). For example, aspects presented herein provide for a user to add one or more fields from existing resources to a dynamic UI form, configure a layout for the dynamic UI form, set data validation (e.g., allow a maximum number of text characters, allow a range of numeric values) for one or more fields in the dynamic UI form, and/or apply conditions (e.g., show/hide a field and/or enable/disable a field based on a value of another field) to one or more fields in the dynamic UI form. The dynamic UI form configurations are stored using a JSON format and associated with an entity (e.g., a task, a workflow). If or when the task and/or workflow is executed, the dynamic UI forms associated with the task and/or workflow are rendered by parsing the JSON fields comprising the configuration for the dynamic UI forms. As such, the dynamic UI forms may be deployed to an end-user without the need for a lengthy development process.

Figure 2:
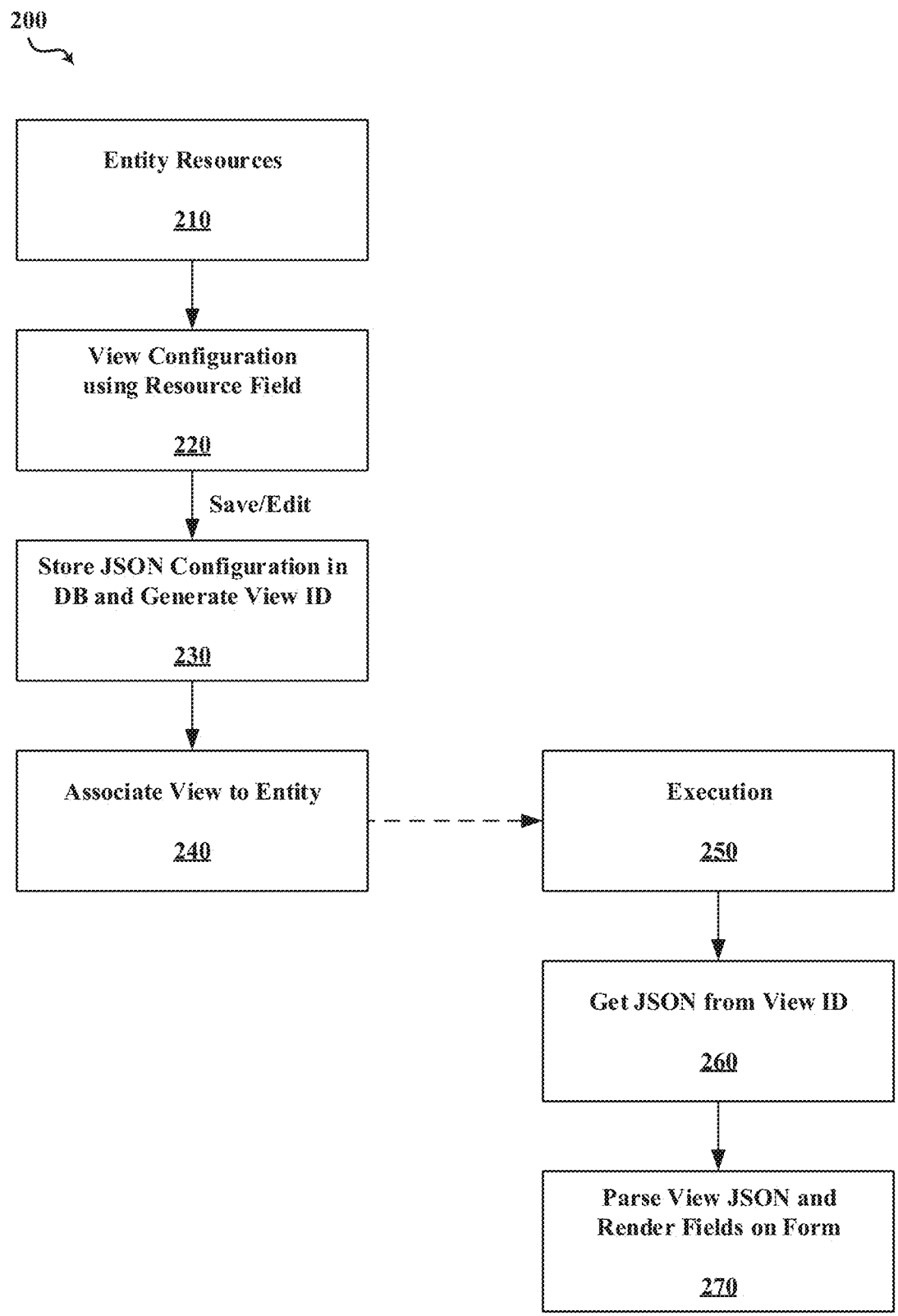
FIG. 2 is an example flow diagram for creating and/or rendering dynamic UIs, in accordance with various embodiments of the present disclosure.

Referring to FIG. 2, the flow diagram 200 illustrates an example process flow for creating and rendering dynamic UIs. The example process flow illustrated in FIG. 2 may be performed by the device 100 of FIG. 1, including the UI rendering component 180.

At block 210 of FIG. 2, the UI rendering component 180 of device 100 may obtain a plurality of resources of one or more entities. For example, the UI rendering component 180 may access a database (DB) and/or one or more files containing the plurality of resources. In some embodiments, the plurality of resources may be stored in the storage component 140 of the device 100 and/or the memory 130 of the device 100. Alternatively or additionally, the plurality of resources may be stored in another device (e.g., a server, internet) that the UI rendering component 180 may access using the communication interface 170 of the device 100. In another example, a portion of the plurality of resources may be stored locally at the device 100 (e.g., memory 130 and/or storage component 140) and a remaining portion of the plurality of resources may be stored remotely (e.g., server, internet).

In some embodiments, each resource of the plurality of resources may comprise parameter-level information. That is, each resource may comprise a grouping (e.g., a table) of related fields and/or parameters. The related fields and/or parameters may be grouped according to subject matter (e.g., patient information), functionality (e.g., UI layout elements), alphabetically (e.g., group 'A', group 'B', group 'C', and so on), and the like. The disclosure is not limited in this regard. For example, a patient name information resource may comprise a first name field, a middle name field, a last (e.g., surname) name field, a name suffix field, and the like. In another example, a patient identification information resource may comprise a street name field, a city field, a state field, an age field, a height field, and the like. In yet another example, a patient billing information resource may comprise a medical insurance provider field, a medical insurance group number field, a credit card issuer field, a credit card number field, and the like. Alternatively or additionally, similar resource groupings may be grouped together. For example, the patient name information resource, the patient identification information resource, and the patient billing information resource may be grouped into a patient information resource.

In some embodiments, each field and/or parameter of a resource may comprise one or more configuration values. For example, a field and/or parameter may comprise at least one configuration value such as, but not limited to, a name, a key, a label, a placeholder text, a suffix label, a default value, and a description. Alternatively or additionally, the configuration values of the fields and/or parameters may comprise validation information (e.g., a maximum number of allowed text characters, an allowed range of numeric values). In other optional or additional embodiments, the configuration values of the fields and/or parameters may indicate whether the field and/or parameter is mandatory (e.g., a corresponding value is required to be entered) or optional (e.g., a corresponding value is not required to be entered). In other optional or additional embodiments, the configuration values of the fields and/or parameters may indicate whether the field and/or parameter is to be shown and/or hidden based on a value of another field and/or based on another condition being met. In other optional or additional embodiments, the configuration values of the fields and/or parameters may indicate whether the field and/or parameter is to be enabled and/or disabled based on a value of another field and/or based on another condition being met.

The UI rendering component 180 may provide for the user to modify (i.e., customize) the configuration values of a field and/or parameter that is included in a UI view, as described in further detail in reference to FIGS. 4-11.

At block 220 of FIG. 2, the UI rendering component 180 may provide for creating a UI view configuration using the plurality of resources obtained at block 210. In some embodiments, the UI rendering component 180 may present the plurality of resources to a user creating the UI view. Alternatively or additionally, the UI rendering component 180 may receive, from the user, one or more requests to include one or more resources of the plurality of resources in the UI view. For example, the requests may comprise common graphical interface operations (e.g., "drag-and-drop" operations and the like) that indicate to the UI rendering component 180 that the one or more resources of the plurality of resources are to be added to the UI view. In other optional or additional embodiments, the UI rendering component 180 may provide for the user to add one or more fields from existing resources to the UI view, configure a layout of the UI view, set data validation (e.g., allow a maximum number of text characters, allow a range of numeric values) for one or more fields in the UI view, and/or apply conditions (e.g., show/hide a field and/or enable/disable a field based on a value of another field) to one or more fields in the UI view. These user operations are described in more detail in reference to FIGS. 4-11.

At block 230 of FIG. 2, the UI rendering component 180 may create a UI configuration of the UI view that has been created (or modified) by the user. For example, the UI rendering component 180 may create the UI view configuration based on receiving an indication from the user that the user has completed the UI view. Alternatively or additionally, the UI rendering component 180 may create the UI view configuration concurrently with the user operations for creating and/or modifying the UI view. In such an example, the UI rendering component 180 may finalize the UI view configuration based on receiving the indication from the user that the user has completed the creation and/or modification of the UI view.

The UI view configuration may comprise configuration information, in a JSON format, of the one or more resources of the plurality of resources to be included in the UI view. The configuration information may comprise an indication identifying each resource of the one or more resources included in the UI view. For example, the configuration information may comprise a name and/or a key value identifying each resource. Alternatively or additionally, the configuration information may comprise layout information for each resource. For example, the layout information may indicate a page identifier for a page of the UI view comprising each resource and/or indicate a section identifier for a section of the UI view comprising each resource. That is, the UI view may be partitioned into one or more pages and each page may be partitioned into one or more sections. In such an example, the layout information may indicate which resources correspond to each page and/or section of the UI view. In some embodiments, if or when the UI view is rendered (e.g., executed), the UI view may display one page at a time and may provide navigational buttons to move between the pages. In other embodiments, if or when the UI view is rendered, the UI view may display two or more pages simultaneously. Alternatively or additionally, sections of the UI view may be arranged horizontally, vertically, and/or in an overlapped manner. In other optional or additional embodiments, one or more sections of the UI view may be conditionally displayed. That is, a section of the UI view may be shown and/or hidden based on a condition being met (e.g., a particular field and/or parameter is set to a particular value). Alternatively or additionally, a section of the UI may be enabled (e.g., input may be permitted) and/or disabled (e.g., input may not be permitted) based on a condition being met. The disclosure is not limited in this regard.

In some embodiments, the layout information may comprise horizontal positioning information and/or vertical positioning information for each resource. The positioning information may be indicated relative to a predetermined point (e.g., origin) of the UI view, of a section of the UI view, and/or a page of the UI view, such as, but not limited to, a top-left corner, a center point, or a bottom-right corner. Alternatively or additionally, the layout information may comprise layering information (e.g., z-order) for each resource. In other embodiments, the horizontal positioning and/or vertical positioning may be determined based on an order of the resources comprised by the UI view. For example, a first resource may be displayed on a top-left corner of the UI view, and a second resource may be displayed below the first resource and left-aligned to the first resource. In another example, the first resource may be displayed on a top-left corner of the UI view, and the second resource may be displayed to the right of the first resource and top-aligned with the first resource. The disclosure is not limited in this regard.

The configuration information of the UI view may comprise field and/or parameter configuration information. For example, the field and/or parameter configuration information may comprise, for one or more resources of the UI view, a corresponding value for a configuration item of the resource. The configuration items may include, but not be limited to, at least one of a name, a key, a label, a placeholder text, a suffix label, a default value, and a description. In some embodiments, the field and/or parameter configuration information may comprise corresponding values for one or more configuration items that have been provided by the user during the creation of the UI view. For example, if or when the user provides a placeholder text value for a particular resource, the field and/or parameter configuration information may comprise the placeholder text value provided by the user. In other embodiments, the field and/or parameter configuration information may comprise an indication to use a default value for one or more configuration items. For example, if or when the user does not provide a corresponding value for a configuration item of a particular resource, the field and/or parameter configuration information may comprise an indication to use a default value of the configuration item of the particular resource.

In some embodiments, the indication to use a default value may comprise including the default value for the configuration item of the particular resource in the field and/or parameter configuration information. In other embodiments, the indication to use a default value may comprise not including a value for the configuration item of the particular resource in the field and/or parameter configuration information. For example, the absence of the configuration item of the particular resource in the field and/or parameter configuration information may serve as an indication to use the default value for the absent configuration item.

The configuration information of the UI view may comprise validation information. For example, the validation information may comprise validation values for one or more resources of the UI view. That is, the UI view may, during execution of the UI view, validate input values provided to the one or more resources using the validation values comprised by the validation information. For example, the validation values may indicate a maximum number (e.g., quantity) of text characters allowed for a text-based resource. In another example, the validation values may indicate a maximum value and/or a minimum value allowed for a number-based resource. In another example, the validation values may indicate a valid date range (e.g., start date and/or end date) for a date-based resource. In some embodiments, the UI view may indicate that the input value provided to the resource does not meet the validation values and/or may request that another input value be provided.

The configuration information of the UI view may comprise an indication of whether one or more resources are mandatory (e.g., a corresponding value is required to be entered) and/or optional (e.g., a corresponding value is not required to be entered).

In some embodiments, the UI rendering component 180 may generate an identifier for the UI view. The UI view identifier may uniquely identify the UI view. Alternatively or additionally, the UI view identifier may be provided by a user and/or another device (e.g., a server). The UI view identifier may be added to the UI view configuration information and be used to identify the stored UI view configuration. For example, if or when the UI view configurations are stored in a database, the database may be indexed based on the UI view identifier such that the UI view configurations stored in the database may be searched based on the UI view identifier.

The UI rendering component 180 may store the UI view configuration in a storage location local to the device 100 (e.g., memory 130 and/or storage component 140). Alternatively or additionally, the UI rendering component 180 may store the UI view configuration in a remote storage location (e.g., server, internet). In such an example, the UI rendering component 180 may access the UI view configuration using the communication interface 170 of the device 100. In another example, a portion of the UI view configuration may be stored locally at the device 100 (e.g., memory 130 and/or storage component 140) and a remaining portion of the UI view configuration may be stored remotely (e.g., server, internet). The disclosure is not limited in this regard.

At block 240 of FIG. 2, the UI rendering component 180 may associate the UI view identifier with an entity. That is, the UI view identifier may be associated with a task and/or a workflow, such that the UI view identified by the UI view identifier may be executed if or when the associated task and/or workflow is executed. In some embodiments, the UI rendering component 180 may add an identifier of the associated entity to the UI view configuration of the UI view. In other embodiments, the UI rendering component 180 may add a mapping between the entity and the UI view to a list (e.g., a database table). The disclosure is not limited in this regard.

At block 250 of FIG. 2, the UI rendering component 180 may determine to execute a UI view. For example, the UI rendering component 180 may receive a request to execute an entity, such as a task or a workflow. The request may be generated by a user, an end-user, and/or another device (e.g., a server). Alternatively or additionally, the request may be automatically generated based on a predetermined schedule. Based on the request, the UI rendering component 180 may identify a UI view associated with the entity that is to be executed. For example, the UI rendering component 180 may select a UI view identifier associated with the entity that is to be executed according to a mapping and/or a database search.

At block 260 of FIG. 2, the UI rendering component 180 may retrieve the UI view configuration, in a JSON format, from a database, for example. The UI rendering component 180 may retrieve the UI view configuration using the UI view identifier associated with the entity that is to be executed. For example, the UI rendering component 180 may search the database storing the UI view configurations using the UI view identifier to retrieve the one or more JSON fields corresponding to the UI view to be executed.

At block 270 of FIG. 2, the UI rendering component 180 may parse the one or more JSON fields corresponding to the UI view configuration. Alternatively or additionally, the UI rendering component 180 may render, based on the parsed one or more JSON fields of the UI view configuration, the UI view. That is, the UI view may be executed by the UI rendering component 180 and presented (e.g., displayed) to an end-user. The end-user may use the executed UI view to provide information necessary to accomplish the entity (e.g., task, workflow) associated with the UI view. Alternatively or additionally, the resources of the executed UI view may be configured according to the configuration information of the UI view configuration. For example, input validation may be performed on one or more resources of the executed UI view according to the validation information of the UI view configuration.

Figure 3:
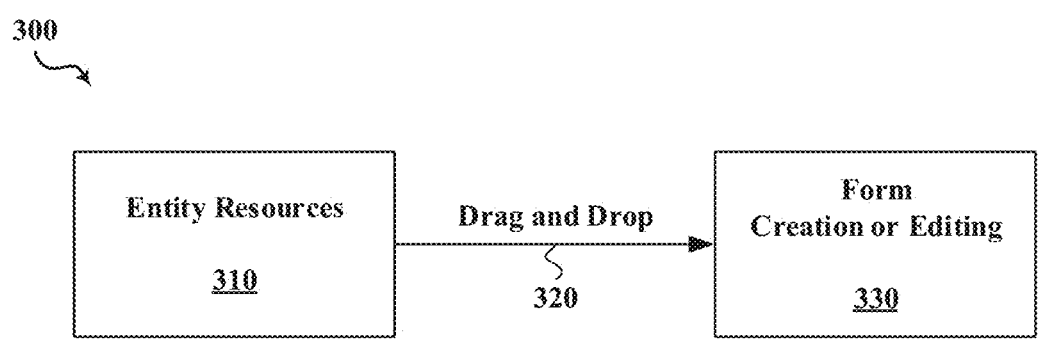
FIG. 3 is an example flow diagram of user input for creating and editing dynamic UIs, in accordance with various embodiments of the present disclosure.

FIG. 3 is a flow diagram 300 illustrating an example process of user input for creating and editing dynamic UIs. The example process flow illustrated in FIG. 3 may be performed by the device 100 of FIG. 1, including the UI rendering component 180.

At block 310 of FIG. 3, the UI rendering component 180 of device 100 may obtain a plurality of resources of one or more entities, as described above in reference to block 210 of FIG. 2. For example, the resources may comprise information of one or more fields and/or parameters in tabular form.

At operation 320 of FIG. 3, the UI rendering component 180 may receive, from the user, one or more requests to include one or more resources of the plurality of resources in the UI view, as described above in reference to block 220 of FIG. 2. For example, the requests may comprise common graphical interface operations (e.g., "drag-and-drop" operations and the like) that indicate to the UI rendering component 180 that the one or more resources of the plurality of resources are to be added to the UI view.

At block 330 of FIG. 2, the UI rendering component 180 may provide for creating and/or editing (e.g., modifying) a UI view configuration using the plurality of resources obtained at block 310 and selected by operation 320, as described above in reference to block 220 of FIG. 2.

Advantageously, and as illustrated in greater detail below, the flow diagrams 200 and 300 described herein may provide for the creation and/or rendering of dynamic UIs that may be used to create dynamic UI views (or forms) for accomplishing one or more entities (e.g., tasks, workflows). In addition, the present disclosure may provide for the creation, modification, and execution of UI views in a user-friendly manner that may not require technical expertise (e.g., software coding skills) to implement and deploy. As such, development costs for creating and deploying UI views may be reduced when compared to conventional software development methodologies. In addition, UI views that may meet rapidly changing requirements may be deployed in a manner that may minimize end-user waiting time, resulting in an improved end-user experience. Furthermore, the use of JSON for storing, parsing, and rendering the UI views may yield execution times that may be faster when compared to other conventional UI deployment methodologies.

Example user interfaces for creating and/or rendering of dynamic UIs are described in reference to FIGS. 4-11.

Figure 4:
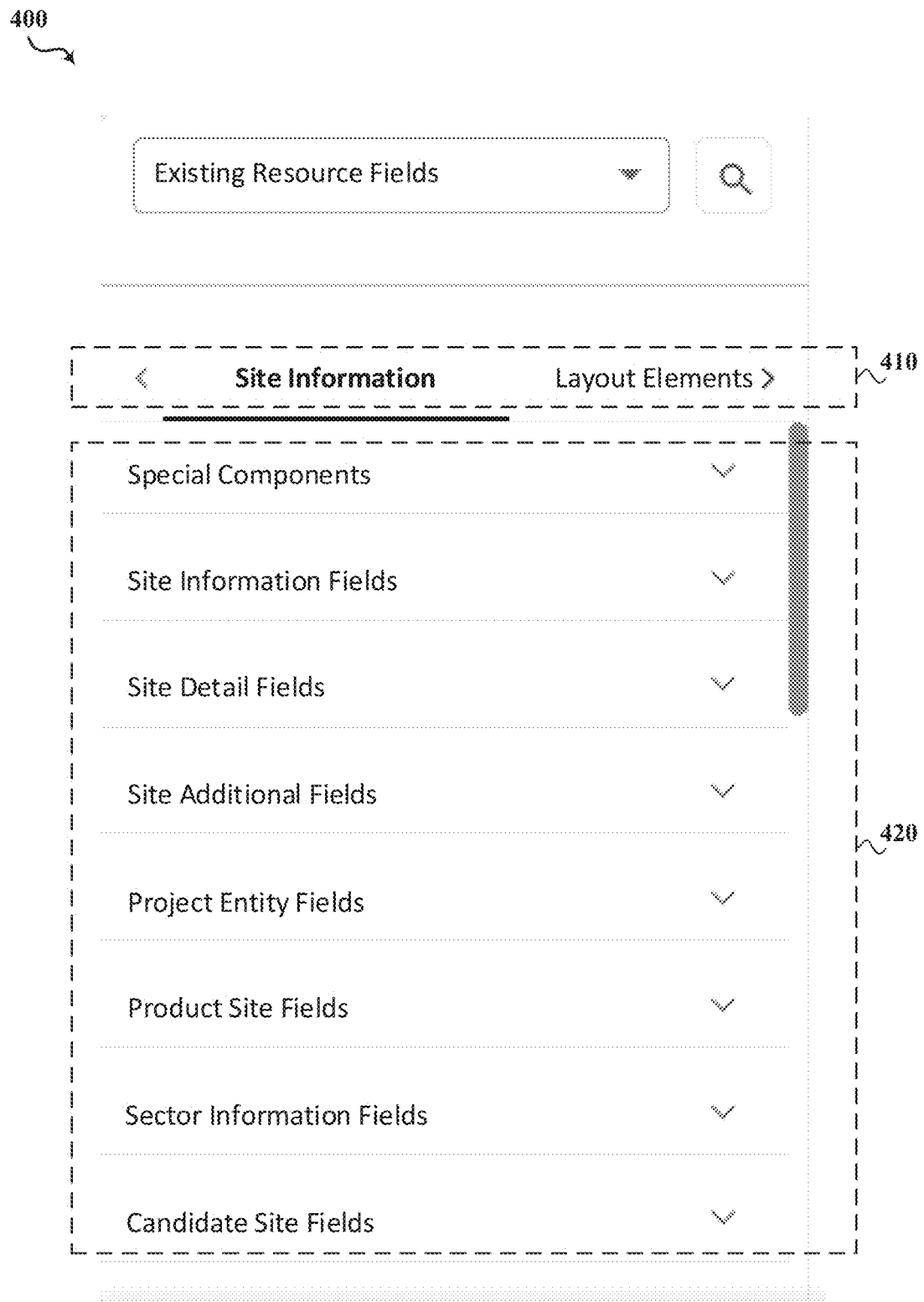
FIG. 4 is an example of a user interface of entity resources, in accordance with various embodiments of the present disclosure.

FIG. 4 is an example of a user interface 400 of entity resources, in accordance with various embodiments of the present disclosure. The user interface 400 may be provided by the UI rendering component 180 and/or a device 100 comprising the UI rendering component 180. For example, the user interface 400 may be displayed by the output component 160 of the device 100 and/or may receive user inputs via the input component 150 of the device 100.

As shown in FIG. 4, the user interface 400 may include a first list 410 of one or more resource groups. For example, the list 410 may include a "site information" resource group and a "layout elements" resource group. The user interface 400 may include a second list 420 of resources. The user interface 400 may populate the second list 420 with the resources comprised by a selected resource group of the first list 410. For example, if or when the "site information" resource group is selected in the first list 410, the second list 420 may include the resources comprised by the "site information" resource group, such as a "special components" resource sub-group, a "site information fields" resource sub-group, a "site detail fields" resource sub-group, a "site additional fields" resource sub-group, a "project entity fields" resource sub-group, a "product site fields" resource sub-group, a "sector information fields" resource sub-group, and a "candidate site fields" resource sub-group.

Alternatively or additionally, the second list 420 may display one or more related fields and/or parameters comprised by a selected resource from the second list 420 (not shown). For example, if or when the "special components" resource of the second list 420 is selected, the second list 420 may display the related fields and/or parameters comprised by the "special components" resource sub-group immediately below the "special components" resource (as shown in FIG. 5).

That is, the user interface 400 may present, to a user, the plurality of resources obtained by the UI rendering component 180 for creating and/or modifying a UI view. Further, the user may navigate (e.g., traverse, browse) through the plurality of resources using the user interface 400 to select one or more resources to add to the UI view, for example.

Figure 5:
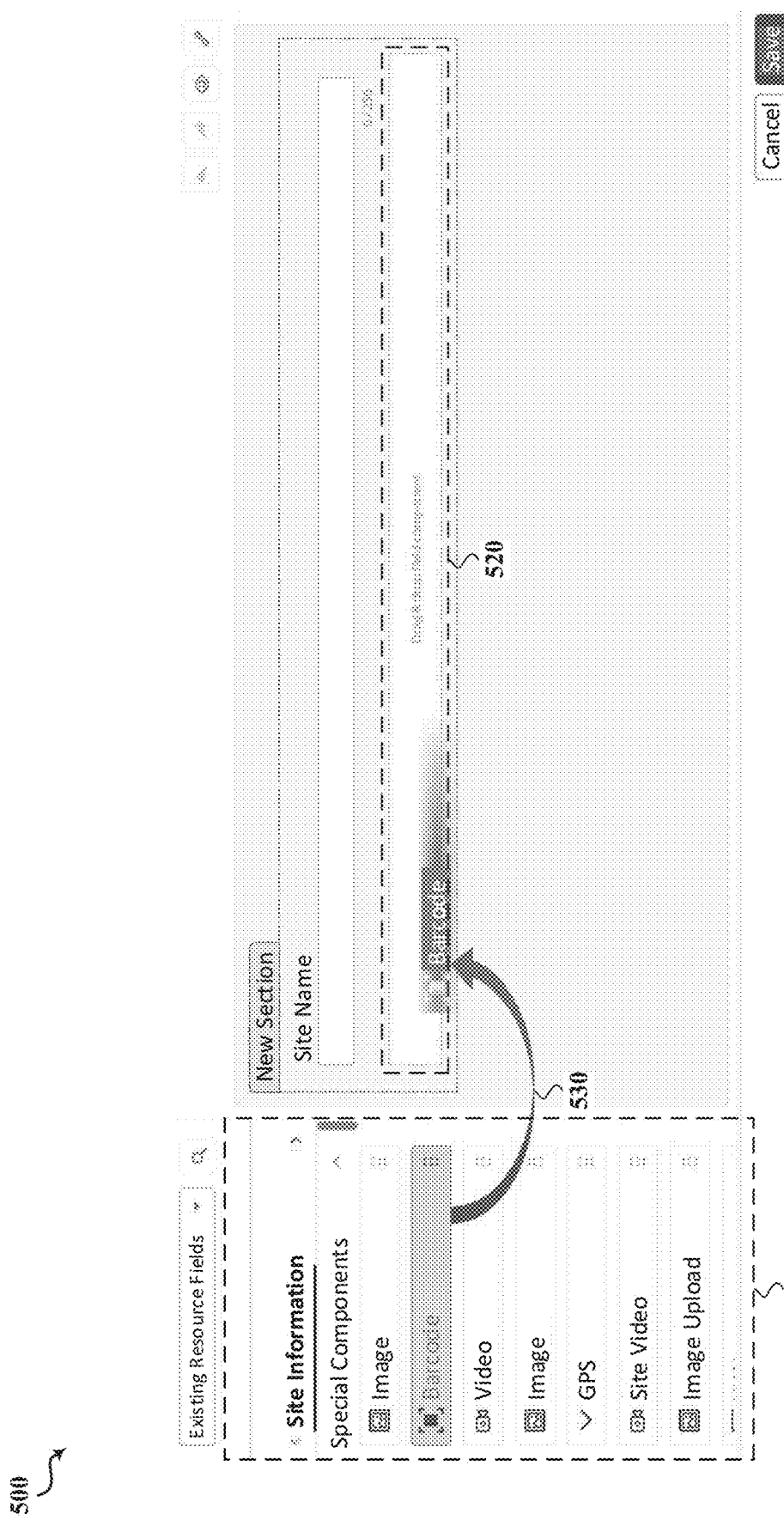
FIG. 5 is an example of a first user interface for creating a UI view, in accordance with various embodiments of the present disclosure.

FIG. 5 is an example of a first user interface 500 for creating a UI view, in accordance with various embodiments of the present disclosure. The first user interface 500 may be provided by the UI rendering component 180 and/or a device 100 comprising the UI rendering component 180. For example, the first user interface 500 may be displayed by the output component 160 of the device 100 and/or may receive user inputs via the input component 150 of the device 100.

As shown in FIG. 5, the first user interface 500 may include in a first display area 510 comprising a first list (e.g., first list 410 of FIG. 4) of one or more resource groups and a second list (e.g., second list 420 of FIG. 4) of resources populated with the resources comprised by a selected resource group of the first list, as described in reference to FIG. 4. That is, the UI rendering component 180 may present a plurality of resources to the user by displaying, to the user in the first display area 510, a list of resource indications corresponding to the plurality of resources of the entity. For example, the first list may list a "site information" resource group, and the second list may list a "special components" group having an "image" field, a "barcode" field, a "video" field, another "image" field, a "GPS" field, a "site video" field, and an "image upload" field.

A portion of the first user interface 500 may display a UI view being created and/or modified. For example, referring to FIG. 5, the UI view may comprise a section titled "New Section" and the section may comprise a "site name" field. The "site name" field may have been previously added to the UI view being created and/or modified.

Continuing to refer to FIG. 5, the user may drag a resource indication from the first display area 510, such as a "barcode" resource indication, to a second display area 520 of the first user interface 500, as denoted by "drag-and-drop" operation 530. That is, the user may drag the resource indication of the list of resource indications from the first display area 510 to the second display area 520. In some embodiments, the second display area 520 may be different from the first display area 510. Further, the user may drop the resource indication of the list of resource indications on the second display area 520.

The UI rendering component 180 may determine, based on the dragging of the resource indication from the first display area 510 and the dropping of the resource indication on the second display area 520, that the user has selected a resource of the plurality of resources corresponding to the resource indication for inclusion in the UI view. As such, the UI rendering component 180 may add the selected resource to the UI view.

In some embodiments, the user may repeat the "drag-and-drop" operation 530 to add additional resources to the UI view.

Figure 6:
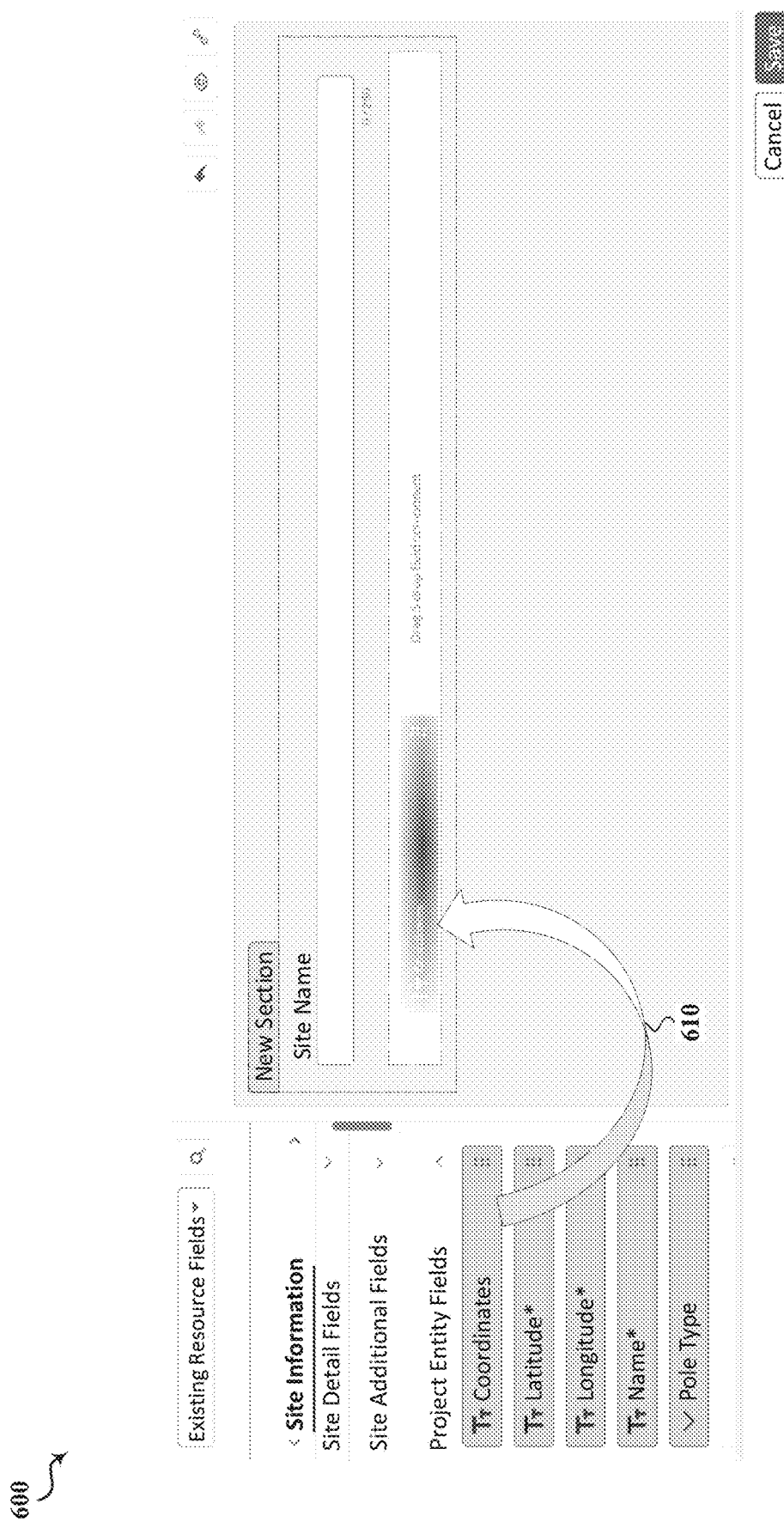
FIG. 6 is an example of a second user interface for creating a UI view, in accordance with various embodiments of the present disclosure.

FIG. 6 is an example of a second user interface 600 for creating a UI view, in accordance with various embodiments of the present disclosure. The second user interface 600 may be provided by the UI rendering component 180 and/or a device 100 comprising the UI rendering component 180. For example, the second user interface 600 may be displayed by the output component 160 of the device 100 and/or may receive user inputs via the input component 150 of the device 100.

As shown in FIG. 6, the user may perform a "drag-and-drop" operation 610 to add multiple resources (e.g., "coordinates", "latitude", "longitude", "name", and "pole type") to a section titled "New Section" of a UI view. That is, the user may select a plurality of resource indications, drag the selected plurality of resource indications to a second display area (e.g., second display area 520), and drop the selected plurality of resource indications on the second display area, to add the selected resources to the UI view. The "drag-and-drop" operation 610 may be similar in many respects to the "drag-and-drop" operations described in reference to FIGS. 2, 3 and 5, and may include additional features not mentioned above.

The UI rendering component 180 may determine, based on the "drag-and-drop" operation 610, that the user has selected multiple resources of the plurality of resources corresponding to the multiple resource indications for inclusion in the UI view. As such, the UI rendering component 180 may add the selected multiple resources to the UI view, as shown in FIG. 7.

Figure 7:
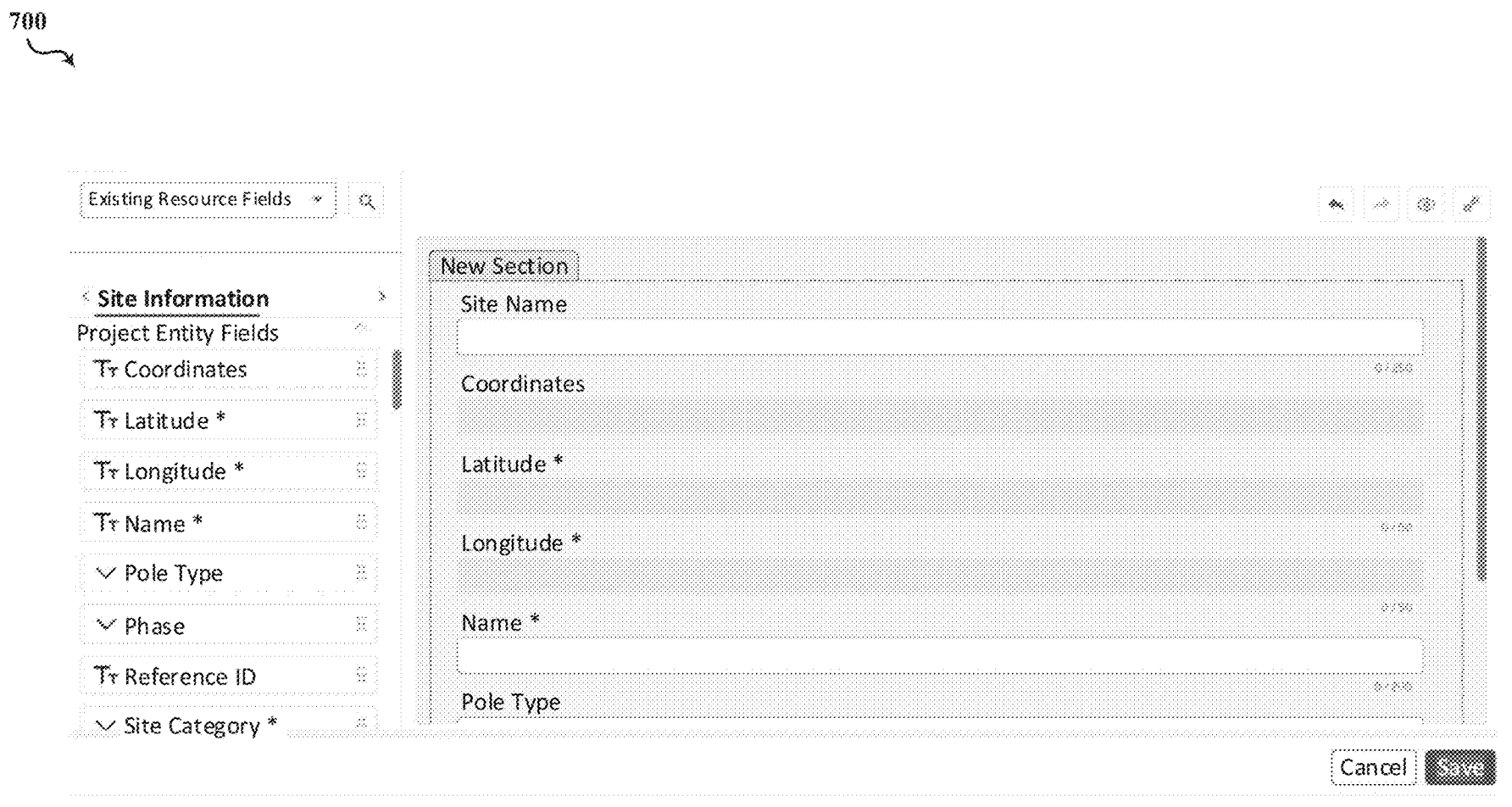

Referring to FIG. 7, a third user interface 700 illustrates the UI view of FIG. 6 after the completion of the "drag-and-drop" operation 610. That is, the third user interface 700 displays the UI view after the multiple resources have been added to the UI view as described in reference to FIG. 6.

The third user interface 700 may be provided by the UI rendering component 180 and/or a device 100 comprising the UI rendering component 180. For example, the third user interface 700 may be displayed by the output component 160 of the device 100 and/or may receive user inputs via the input component 150 of the device 100.

In some embodiments, an inclusion of an asterisk symbol (*) to the name of a resource indication (e.g., "Latitude*") may indicate that the resource is configured as mandatory resource. That is, the end-user may be required to enter an input value for such a resource prior to completing the entity (e.g., task, workflow) associated with the UI view.

Figure 8:
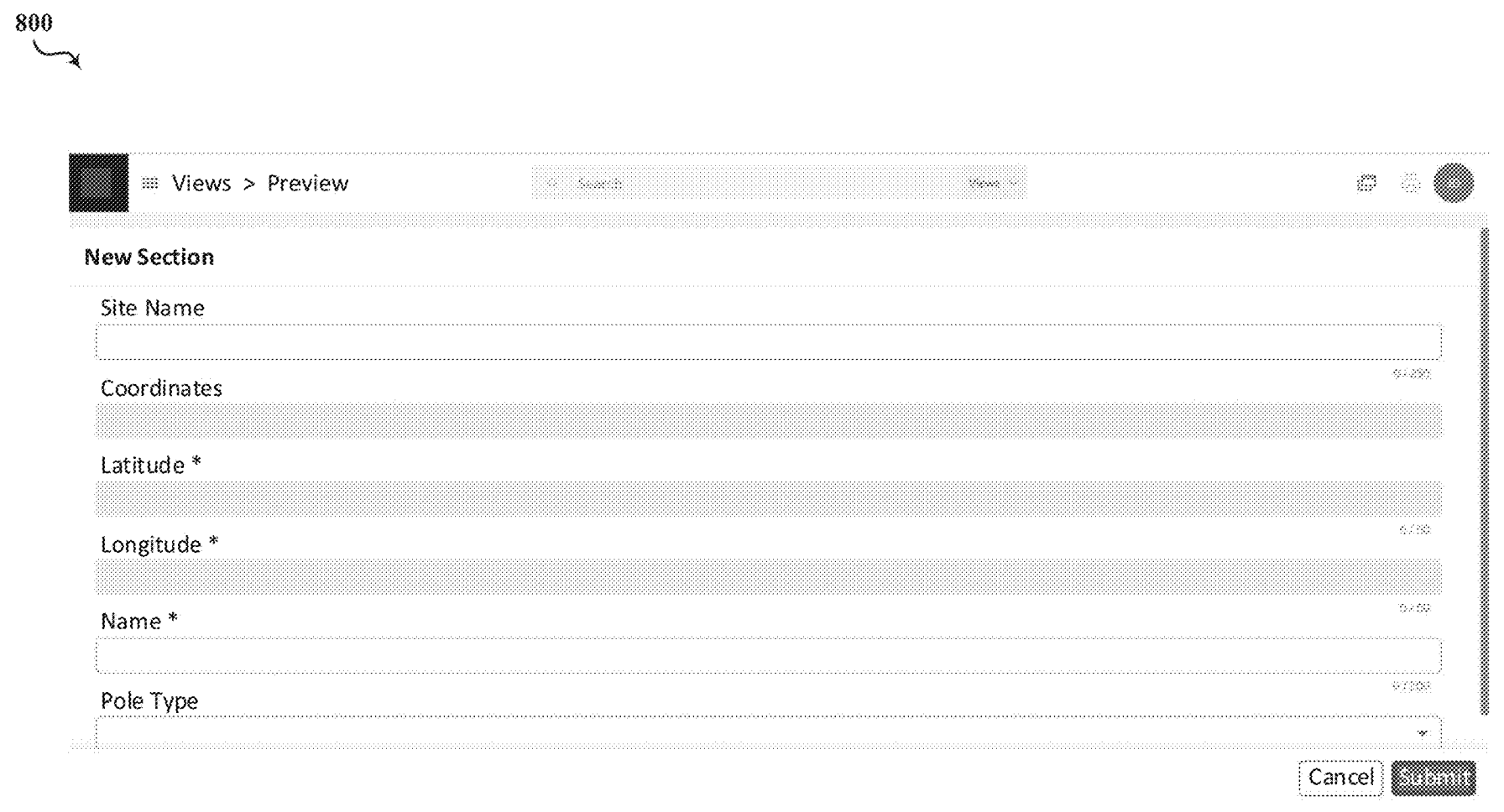

FIG. 8 is an example of a preview 800 of a UI view, in accordance with various embodiments of the present disclosure. The preview 800 may be provided by the UI rendering component 180 and/or a device 100 comprising the UI rendering component 180. For example, the preview 800 may be displayed by the output component 160 of the device 100 and/or may receive user inputs via the input component 150 of the device 100.

The UI rendering component 180 may generate, based on the UI configuration, a preview of the UI view, such as the preview 800, for example. Alternatively or additionally, the UI rendering component 180 may display, to the user, the preview of the UI view. The preview 800 may provide a graphical representation of a rendered UI view. That is, a layout of the UI view resources in the preview 800 may match the layout of the UI view resources of the UI view when rendered. Alternatively or additionally, the preview 800 may provide a same functionality as a rendered UI view. That is, the preview 800 may perform input validation and/or apply conditions (e.g., show/hide a resource and/or enable/disable a resource based on a value of another resource) according to the UI view configuration of the UI view being previewed. As such, the user creating and/or modifying the UI view may confirm and/or validate the UI view configuration of the UI view being previewed with the preview 800.

FIG. 9 is an example of a first user interface 900 for editing a UI view, in accordance with various embodiments of the present disclosure. The first user interface 900 may be provided by the UI rendering component 180 and/or a device 100 comprising the UI rendering component 180. For example, the first user interface 900 may be displayed by the output component 160 of the device 100 and/or may receive user inputs via the input component 150 of the device 100.

The first user interface 900 presents a portion of a UI view configuration. For example, as shown in FIG. 9, the first user interface may display a "site name" field, a "coordinates" field, a "latitude" field, a "name" field, and a "longitude" field comprised by a section titled "New Section" of a UI view. The user may select a field shown in first user interface 900 by clicking on and/or touching a desired field, such as the "name" field 910, for example. In response to the user selection, the first user interface 900 may display one or more actions 920. That is, the UI rendering component 180 may receive, from the user, a modification request identifying a particular resource (e.g., field 910) of the one or more resources of the plurality of resources included in the UI view.

The actions 920 may comprise one or more field management and/or configurations functions that the user may perform on the selected field 910, such as editing the selected field 910 (e.g., using the second user interface 1000), moving the selected field 910 to another location in the UI view, deleting the selected field 910 from the UI view, and viewing and/or previewing configuration information of the selected field 910. For example, selection of the edit icon of the actions 920 may start the second user interface 1000 of FIG. 10.

Figure 10:
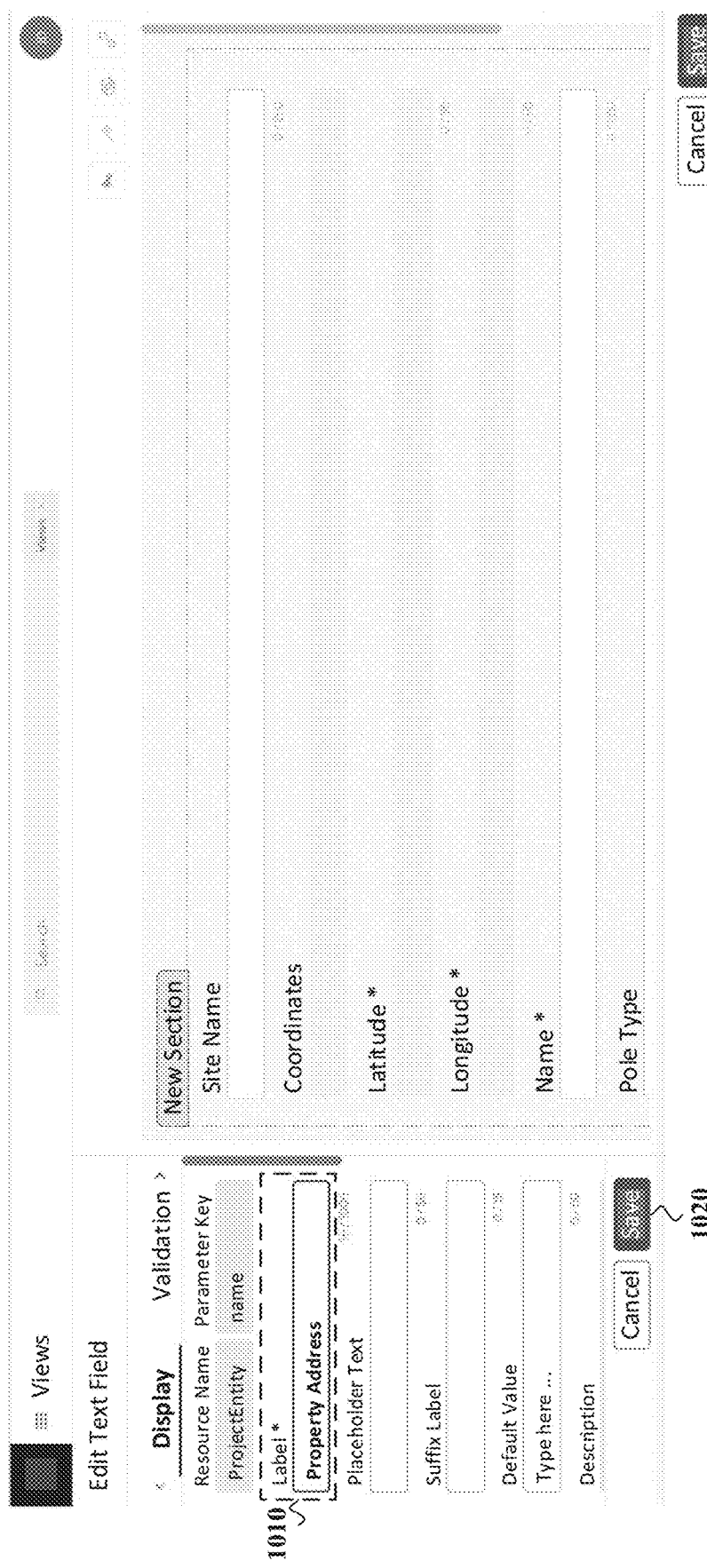
FIG. 10 is an example of a second user interface for editing a UI view, in accordance with various embodiments of the present disclosure.

FIG. 10 is an example of a second user interface 1000 for editing a UI view, in accordance with various embodiments of the present disclosure. The second user interface 1000 may be provided by the UI rendering component 180 and/or a device 100 comprising the UI rendering component 180. For example, the second user interface 1000 may be displayed by the output component 160 of the device 100 and/or may receive user inputs via the input component 150 of the device 100.

The second user interface 1000 may present the configuration information for the selected field 910. That is, the UI rendering component 180 may display, to the user, particular configuration information corresponding to the particular resource (e.g., field 910). For example, as shown in FIG. 10, the second user interface 1000 may present configuration information related to the display of the selected field 910, such as, but not limited to, a resource name, a parameter key, a label, a placeholder text, a suffix label, a default value, and a description. Alternatively or additionally, the second user interface 1000 may present additional configuration information of the selected field 910 such as validation configuration information and/or conditional configuration information.

The user may, using the second user interface 1000, modify one or more configuration values of the selected field 910. For example, as shown at 1010 in FIG. 10, the user may modify the label for the selected field 910 to read "Property Address." The second user interface 600 may include a save button 1020 to save (e.g., commit) the changes made on the second user interface 1000 to the configuration information of the selected field 910 and return to the first user interface 900 of FIG. 9. The UI rendering component may update, based on the one or more modifications to the particular configuration information (e.g., 1010) from the user, the UI configuration of the UI view, resulting in an updated UI configuration. Alternatively or additionally, the UI rendering component 180 may store the updated UI view configuration in the database comprising the UI view configurations.

Figure 11:
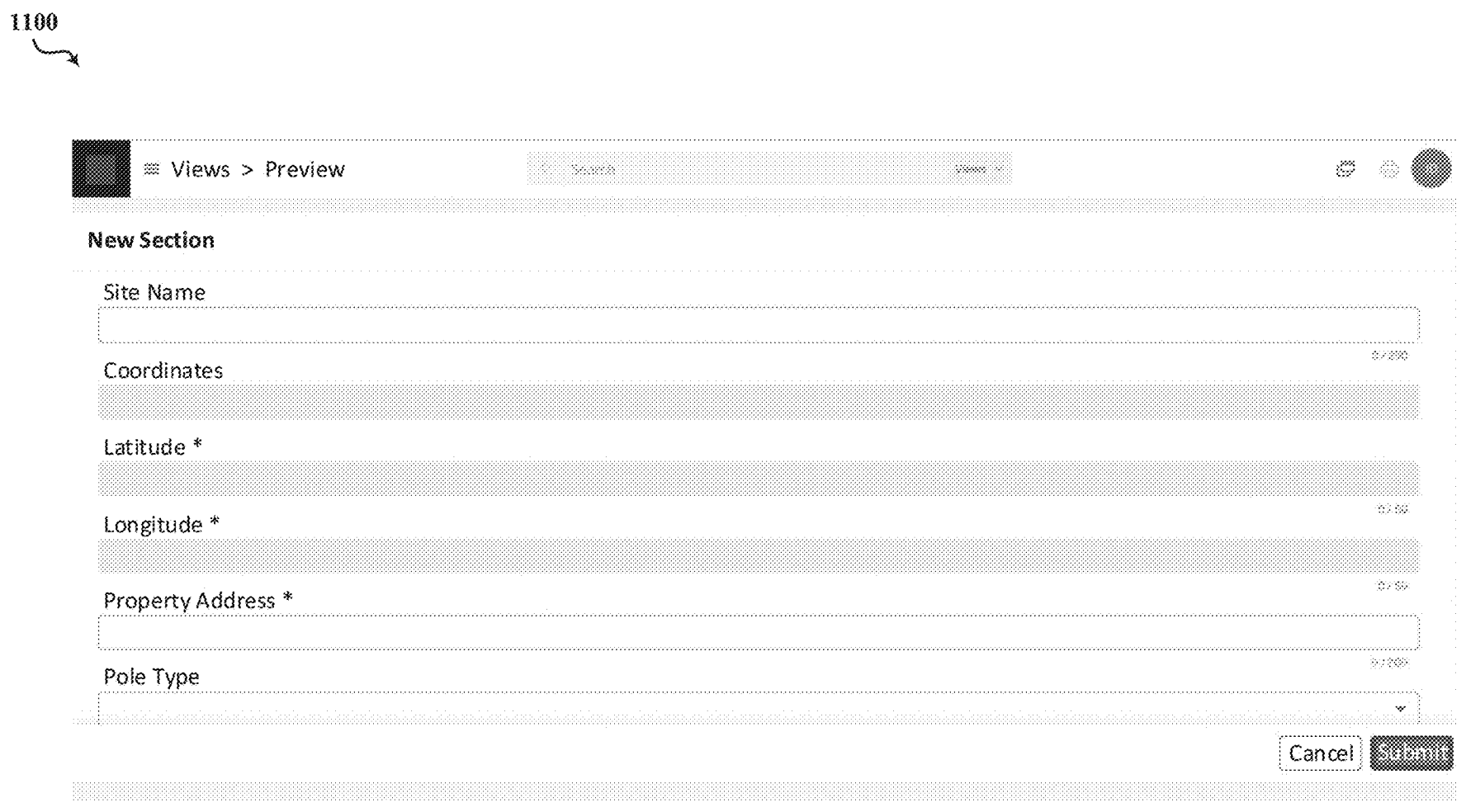

FIG. 11 is an example of a preview 1100 of an updated UI view, in accordance with various embodiments of the present disclosure. The preview 1100 may be provided by the UI rendering component 180 and/or a device 100 comprising the UI rendering component 180. For example, the preview 1100 may be displayed by the output component 160 of the device 100 and/or may receive user inputs via the input component 150 of the device 100.

The UI rendering component 180 may generate, based on the updated UI configuration as described in reference to FIG. 10, a preview of the updated UI view, such as the preview 1100, for example. Alternatively or additionally, the UI rendering component 180 may display, to the user, the preview of the updated UI view. The preview 1100 may be similar in many respects to the preview 800 described in reference to FIG. 8, and a detailed description is omitted here for the sake of brevity.

Advantageously, and as described in reference to FIGS. 4-11, the aspects described herein may provide for the creation and/or rendering of dynamic UIs that may be used to create dynamic UI views (or forms) for accomplishing one or more entities (e.g., tasks, workflows). In addition, the present disclosure may provide for the creation, modification, and execution of UI views in a user-friendly manner that may not require technical expertise (e.g., software coding skills) to implement and deploy. As such, development costs for creating and deploying UI views may be reduced when compared to conventional software development methodologies. In addition, UI views that may meet rapidly changing requirements may be deployed in a manner that may minimize end-user waiting time, resulting in an improved end-user experience. Furthermore, the use of JSON for storing, parsing, and rendering the UI views may yield execution times that may be faster when compared to other conventional UI deployment methodologies.

Figure 12:
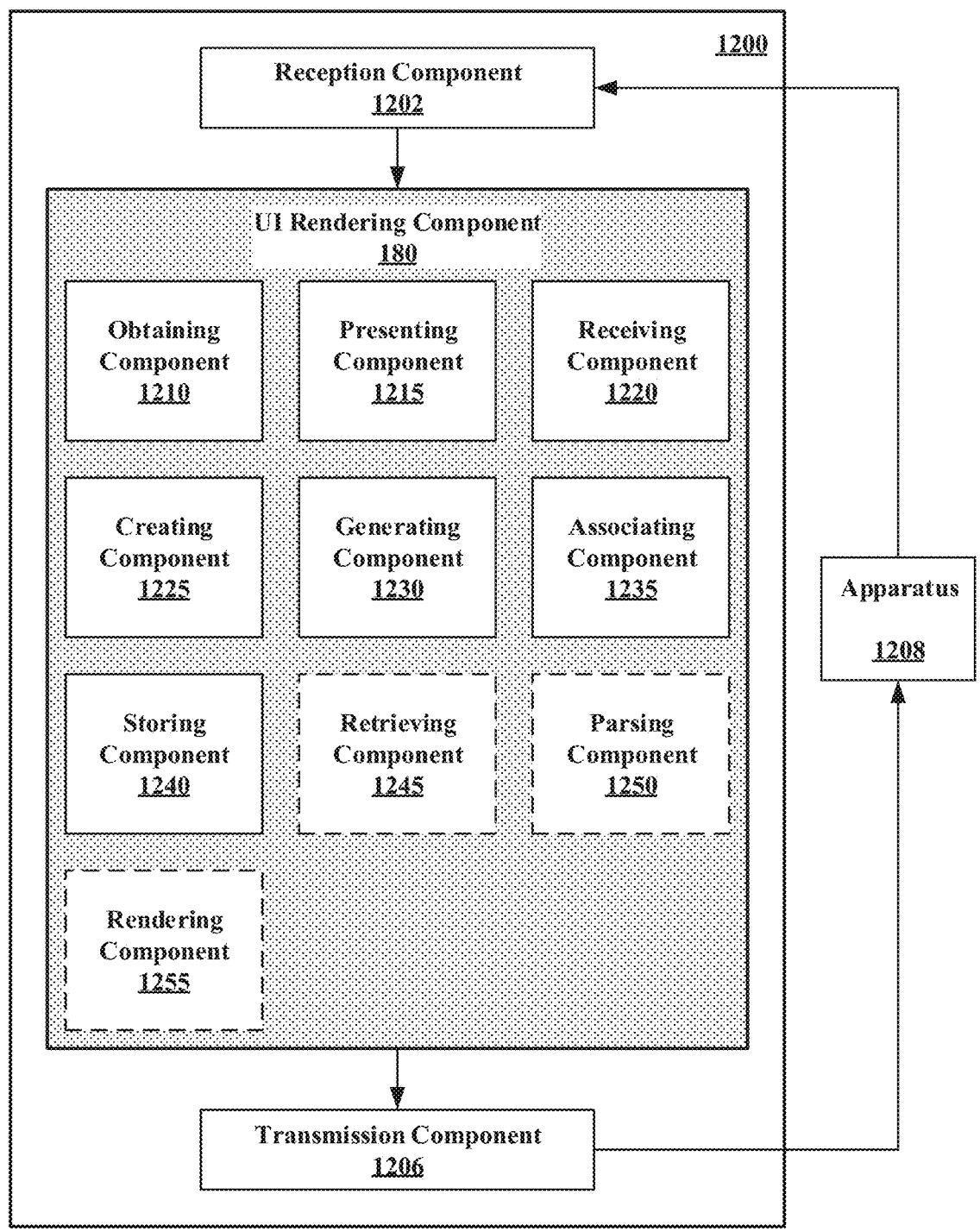
FIG. 12 is a block diagram of an example apparatus for creating and/or rendering dynamic UIs, in accordance with various embodiments of the present disclosure.

FIG. 12 is a block diagram of an example apparatus 1200 for designing datacenter facilities. The apparatus 1200 may be a computing device (e.g., device 100 of FIG. 1) or a computing device may include the apparatus 1200. In some embodiments, the apparatus 1200 may include a reception component 1202 configured to receive communications (e.g., wired, wireless) from another apparatus (e.g., apparatus 1208), a UI rendering component 180 configured to create and/or render dynamic UIs, and a transmission component 1206 configured to transmit communications (e.g., wired, wireless) to another apparatus (e.g., apparatus 1208). The components of the apparatus 1200 may be in communication with one another (e.g., via one or more buses or electrical connections). As shown in FIG. 12, the apparatus 1200 may be in communication with another apparatus 1208 (such as a database, a server, or another computing device) using the reception component 1202 and/or the transmission component 1206.

In some embodiments, the apparatus 1200 may be configured to perform one or more operations described herein in connection with FIGS. 1-11. Alternatively or additionally, the apparatus 1200 may be configured to perform one or more processes described herein, such as method 1300 of FIG. 13. In some embodiments, the apparatus 1200 may include one or more components of the device 100 described above in connection with FIG. 1.

The reception component 1202 may receive communications, such as control information, data communications, or a combination thereof, from the apparatus 1208. The reception component 1202 may provide received communications to one or more other components of the apparatus 1200, such as the UI rendering component 180. In some aspects, the reception component 1202 may perform signal processing on the received communications, and may provide the processed signals to the one or more other components. In some embodiments, the reception component 1202 may include one or more antennas, a receive processor, a controller/processor, a memory, or a combination thereof, of the device 100 described above in reference to FIG. 1.

The transmission component 1206 may transmit communications, such as control information, data communications, or a combination thereof, to the apparatus 1208. In some embodiments, the UI rendering component 180 may generate communications and may transmit the generated communications to the transmission component 1206 for transmission to the apparatus 1208. In some embodiments, the transmission component 1206 may perform signal processing on the generated communications, and may transmit the processed signals to the apparatus 1208. In other embodiments, the transmission component 1206 may include one or more antennas, a transmit processor, a controller/processor, a memory, or a combination thereof, of the device 100 described above in reference to FIG. 1. In some embodiments, the transmission component 1206 may be co-located with the reception component 1202 such as in a transceiver and/or a transceiver component.

The UI rendering component 180 may be configured to create and/or render dynamic UIs. In some embodiments, the UI rendering component 180 may include a set of components, such as an obtaining component 1210 configured to obtain a plurality of resources of an entity, a presenting component 1215 configured to present the plurality of resources to a user, a receiving component 1220 configured to receive at least one request to include one or more resources of the plurality of resources in a UI view, a creating component 1225 configured to create a UI configuration of the UI view, a generating component 1230 configured to an identifier for the UI view, an associating component 1235 configured to associate the identifier of the UI view with the entity, and a storing component configured to store the UI configuration in a database.

Alternatively or additionally, the UI rendering component 180 may further include a retrieving component 1245 configured to retrieve the UI configuration from the database, a parsing component 1250 configured to parse one or more JSON fields of the UI configuration, and a rendering component 1255 configured to render the UI view.

In some embodiments, the set of components may be separate and distinct from the UI rendering component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 1.

Figure 13:
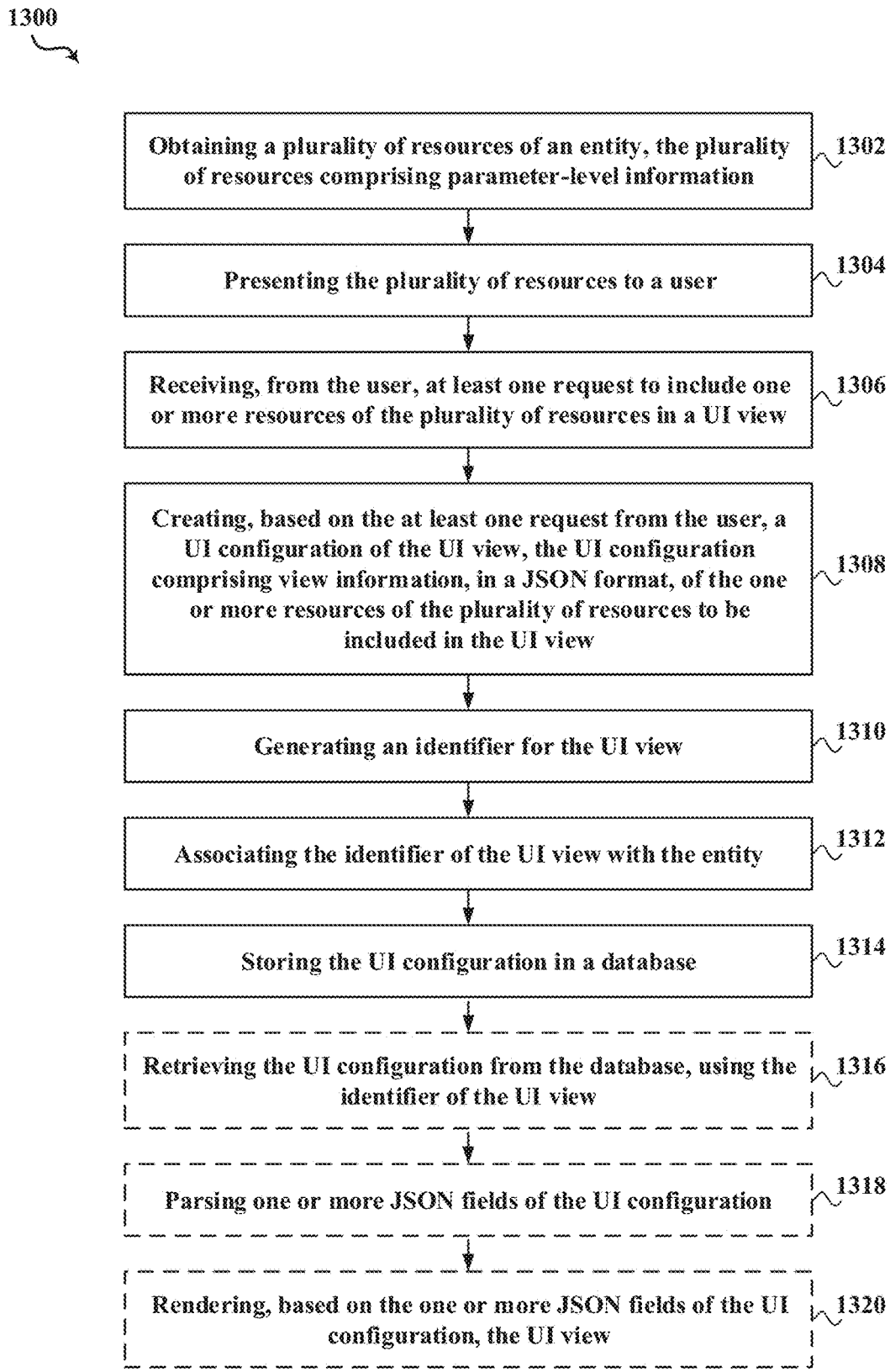
FIG. 13 is flowchart of an example method of creating and/or rendering dynamic UIs, in accordance with various embodiments of the present disclosure.

Referring to FIG. 13, in operation, a device 100 may perform a method 1300 of creating and/or rendering a dynamic UI. The method 1300 may be performed by the device 100 (which may include the memory 130 and which may be the entire device 100 and/or one or more components of the device 100, such as the processor 120, the input component 150, the output component 160, the communication interface 170, and/or the UI rendering component 180). The method 1300 may be performed by the UI rendering component 180 in communication with the apparatus 1208.

At block 1302 of FIG. 13, the method 1300 may include obtaining a plurality of resources of an entity, the plurality of resources comprising parameter-level information. For example, in an embodiment, the device 100, the UI rendering component 180, and/or the obtaining component 1210 may be configured to or may comprise means for obtaining a plurality of resources of an entity, the plurality of resources comprising parameter-level information.

For example, the obtaining at block 1302 may include access a database and/or one or more files containing the plurality of resources, as described above in reference to block 210 of FIG. 2. In some embodiments, the obtaining at block 1302 may include the UI rendering component 180 accessing the plurality of resources stored in the storage component 140 of the device 100 and/or the memory 130 of the device 100. In other optional or additional embodiments, the obtaining at block 1302 may include the UI rendering component 180 accessing the plurality of resources stored in apparatus 1208 (e.g., a server, a database, internet) using the communication interface 170 of the device 100. In other optional or additional embodiments, the obtaining at block 1302 may include the UI rendering component 180 accessing a portion of the plurality of resources stored locally at the device 100 (e.g., memory 130 and/or storage component 140) and a remaining portion of the plurality of resources stored remotely (e.g., server, internet).

Further, for example, the obtaining at block 1302 may be performed to obtain the resources with which to create the dynamic UIs.

At block 1304 of FIG. 13, the method 1300 may include presenting the plurality of resources to a user. For example, in an embodiment, the device 100, the UI rendering component 180, and/or the presenting component 1215 may be configured to or may comprise means for presenting the plurality of resources to a user.

For example, the presenting at block 1304 may include presenting the plurality of resources to a user creating and/or modifying a UI view, as described above in reference to block 220 of FIG. 2 and FIGS. 4 and 5. Further, for example, the presenting at block 1304 may be performed to provide the user creating and/or modifying a UI view with the resources with which to create the dynamic UIs.

In other optional or additional embodiments, the presenting at block 1304 may include displaying, to the user in a first display area, a list of resource indications corresponding to the plurality of resources of the entity.

At block 1306 of FIG. 13, the method 1300 may include receiving, from the user, at least one request to include one or more resources of the plurality of resources in a UI view. For example, in an embodiment, the device 100, the UI rendering component 180, and/or the receiving component 1220 may be configured to or may comprise means for receiving, from the user, at least one request to include one or more resources of the plurality of resources in a UI view.

For example, the at least one request at block 1306 may comprise a common graphical interface operation (e.g., "drag-and-drop" operations and the like) that indicates to the UI rendering component 180 that the one or more resources of the plurality of resources are to be added to the UI view, as described in reference to block 220 of FIG. 2 and FIGS. 3, 5, and 6.

In other optional or additional embodiments, the receiving at block 1306 may include dragging, by the user, a resource indication of the list of resource indications from the first display area to a second display area. The second display area may be different from the first display area.

In other optional or additional embodiments, the receiving at block 1306 may further include dropping, by the user, the resource indication of the list of resource indications on the second display area.

In other optional or additional embodiments, the receiving at block 1306 may further include determining, based on the dragging of the resource indication from the first display area and the dropping of the resource indication on the second display area, that the user has selected a resource of the plurality of resources corresponding to the resource indication for inclusion in the UI view.

Further, for example, the receiving at block 1306 may be performed to provide for the creation, modification, and execution of UI views in a user-friendly manner that may not require technical expertise (e.g., software coding skills) to implement and deploy. Thus, development costs for creating and deploying UI views may be reduced when compared to conventional software development methodologies. In addition, UI views that may meet rapidly changing requirements may be deployed in a manner that may minimize end-user waiting time, resulting in an improved end-user experience.

At block 1308 of FIG. 13, the method 1300 may include creating, based on the at least one request from the user, a UI configuration of the UI view, the UI configuration comprising view information, in a JSON format, of the one or more resources of the plurality of resources to be included in the UI view. For example, in an embodiment, the device 100, the UI rendering component 180, and/or the creating component 1225 may be configured to or may comprise means for creating, based on the at least one request from the user, a UI configuration of the UI view, the UI configuration comprising view information, in a JSON format, of the one or more resources of the plurality of resources to be included in the UI view.

For example, the creating at block 1308 may include creating a UI configuration of the UI view that has been created (and/or modified) by the user, as described in reference to block 230 of FIG. 2. For example, the UI rendering component 180 may create the UI view configuration based on receiving an indication from the user that the user has completed the UI view. Alternatively or additionally, the UI rendering component 180 may create the UI view configuration concurrently with the user operations for creating and/or modifying the UI view.

Further, for example, the creating at block 1308 may be performed to provide for the creation, modification, and execution of UI views in a user-friendly manner that may not require technical expertise (e.g., software coding skills) to implement and deploy. Thus, development costs for creating and deploying UI views may be reduced when compared to conventional software development methodologies. In addition, UI views that may meet rapidly changing requirements may be deployed in a manner that may minimize end-user waiting time, resulting in an improved end-user experience. Furthermore, the use of JSON for storing, parsing, and rendering the UI views may yield execution times that may be faster when compared to other conventional UI deployment methodologies.

At block 1310 of FIG. 13, the method 1300 may include generating an identifier for the UI view. For example, in an embodiment, the device 100, the UI rendering component 180, and/or the generating component 1230 may be configured to or may comprise means for generating an identifier for the UI view. For example, the generating at block 1310 may include generating an UI view identifier may uniquely identify the UI view, as described in reference to block 230 of FIG. 2.

At block 1312 of FIG. 13, the method 1300 may include associating the identifier of the UI view with the entity. For example, in an embodiment, the device 100, the UI rendering component 180, and/or the associating component 1235 may be configured to or may comprise means for associating the identifier of the UI view with the entity.

For example, the associating at block 1312 may include associating the UI view identifier with a task and/or a workflow, as described in reference to block 240 of FIG. 2.

Further, for example, the associating at block 1312 may be performed to the UI view identified by the UI view identifier may be executed if or when the associated task and/or workflow is executed.

At block 1314 of FIG. 13, the method 1300 may include storing the UI configuration in a database. For example, in an embodiment, the device 100, the UI rendering component 180, and/or the storing component 1240 may be configured to or may comprise means for storing the UI configuration in a database.

For example, the storing at block 1314 may include storing at least a portion of the UI view configuration in a storage location local to the device 100 (e.g., memory 130 and/or storage component 140), as described above in reference to block 230 of FIG. 2. In some embodiments, the storing at block 1314 may include storing a portion of the UI view configuration in the apparatus 1208 (e.g., database, server, internet).

In optional or additional embodiments that may be combined with any other embodiment, at block 1316 of FIG. 13, the method 1300 may include retrieving the UI configuration from the database, using the identifier of the UI view. For example, in an embodiment, the device 100, the UI rendering component 180, and/or the retrieving component 1245 may be configured to or may comprise means for retrieving the UI configuration from the database, using the identifier of the UI view.

For example, the retrieving at block 1316 may include the UI rendering component 180 retrieving the UI view configuration using the UI view identifier associated with the entity that is to be executed. In some embodiments, the retrieving at block 1316 may include searching the database storing the UI view configurations using the UI view identifier to retrieve the one or more JSON fields corresponding to the UI view to be executed, as described in reference to block 260 of FIG. 2.

Further, for example, the retrieving at block 1316 may be performed to obtain the UI view configuration information with which the dynamic UI can be rendered. As such, UI views that may meet rapidly changing requirements may be deployed in a manner that may minimize end-user waiting time, resulting in an improved end-user experience. Furthermore, the use of JSON for storing, parsing, and rendering the UI views may yield execution times that may be faster when compared to other conventional UI deployment methodologies.

In optional or additional embodiments that may be combined with any other embodiment, at block 1318 of FIG. 13, the method 1300 may include parsing one or more JSON fields of the UI configuration. For example, in an embodiment, the device 100, the UI rendering component 180, and/or the parsing component 1250 may be configured to or may comprise means for parsing one or more JSON fields of the UI configuration.

For example, the parsing at block 1318 may include parsing the one or more JSON fields corresponding to the UI view configuration, as described in reference to block 270 of FIG. 2. Further, for example, the parsing at block 1318 may be performed to extract the UI view configuration from the stored JSON fields. In addition, the use of JSON for storing, parsing, and rendering the UI views may yield execution times that may be faster when compared to other conventional UI deployment methodologies.

In optional or additional embodiments that may be combined with any other embodiment, at block 1320 of FIG. 13, the method 1300 may include rendering, based on the one or more JSON fields of the UI configuration, the UI view. For example, in an embodiment, the device 100, the UI rendering component 180, and/or the rendering component 1255 may be configured to or may comprise means for rendering, based on the one or more JSON fields of the UI configuration, the UI view.

For example, the rendering at block 1320 may include rendering the UI view according to the stored UI view configuration associated with the entity to be performed, as described above in reference to block 270 of FIG. 2.

Further, for example, the rendering at block 1320 may be performed to execute the UI view and obtain from the end-user the information necessary to accomplish the entity (e.g., task, workflow) associated with the UI view. As such, UI views that may meet rapidly changing requirements may be deployed in a manner that may minimize end-user waiting time, resulting in an improved end-user experience. Furthermore, the use of JSON for storing, parsing, and rendering the UI views may yield execution times that may be faster when compared to other conventional UI deployment methodologies.

In other optional or additional embodiments, the rendering at block 1320 may include displaying, to the user, the UI view.

In other optional or additional embodiments that may be combined with any other embodiment, the method 1300 may include receiving, from the user, validation information of a resource of the one or more resources of the plurality of resources included in the UI view. Such optional or additional embodiments may include adding the validation information to the UI configuration of the UI view. In such optional or additional embodiments, the rendering at block 1320 may include performing input validation of the resource according to the validation information.

In other optional or additional embodiments that may be combined with any other embodiment, the method 1300 may include generating, based on the UI configuration, a preview of the UI view, and displaying, to the user, the preview of the UI view.

In other optional or additional embodiments that may be combined with any other embodiment, the method 1300 may include receiving, from the user, additional UI configuration information comprising at least one of a resource label, a placeholder text, a suffix label, and a default value, and adding the additional UI configuration information to the UI configuration.

In other optional or additional embodiments that may be combined with any other embodiment, the method 1300 may include receiving, from the user, a modification request identifying a particular resource of the one or more resources of the plurality of resources included in the UI view. Such optional or additional embodiments may further include displaying, to the user, particular configuration information corresponding to the particular resource. Such optional or additional embodiments may further include receiving, from the user, one or more modifications to the particular configuration information. Such optional or additional embodiments may further include updating, based on the one or more modifications to the particular configuration information from the user, the UI configuration of the UI view, resulting in an updated UI configuration. Such optional or additional embodiments may further include storing the updated UI configuration in the database.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of rendering a dynamic user interface (UI) by an apparatus, wherein the dynamic UI includes a dynamic form to be filled out by a user, the method comprising:
    obtaining, by a processor of the apparatus, a plurality of resources of an entity, the plurality of resources comprising parameter-level information;
    presenting, by the processor, the plurality of resources to a user;
    receiving, by the processor from the user and at a second time after a deployment of the dynamic form, wherein the dynamic form is deployed at a first time, at least one request to include one or more resources of the plurality of resources in a UI view, wherein the one or more resources includes an additional requirement for the form added using a drag-and-drop operation;
    creating, by the processor based on the at least one request from the user, a UI configuration of the UI view, the UI configuration comprising view information, in a JavaScript Object Notation (JSON) format, of the one or more resources of the plurality of resources to be included in the UI view;
    generating, by the processor, an identifier for the UI view;
    associating, by the processor, the identifier of the UI view with the entity, wherein the entity is a work flow;
    storing, by the processor, the UI configuration in a database;
    receiving a request to execute the work flow; and
    rendering the dynamic form at a third time of the request, thereby including the additional requirement in the form, wherein the third time is after the second time, and the second time is after the first time.

2. The method of claim 1, further comprising:
    retrieving, by the processor, the UI configuration from the database, using the identifier of the UI view;
    parsing, by the processor, one or more JSON fields of the UI configuration; and
    performing the rendering, by the processor based on the one or more JSON fields of the UI configuration, the UI view.

3. The method of claim 2, wherein the rendering of the UI view comprises displaying, by the processor to the user, the UI view.

4. The method of claim 2, further comprising:
    receiving, by the processor from the user, validation information of a resource of the one or more resources of the plurality of resources included in the UI view; and
    adding, by the processor, the validation information to the UI configuration of the UI view,
    wherein the rendering of the UI view comprises performing, by the processor, input validation of the resource according to the validation information.

5. The method of claim 1, wherein:
    the presenting of the plurality of resources to the user comprises displaying, by the processor to the user in a first display area, a list of resource indications corresponding to the plurality of resources of the entity; and
    the receiving of the at least one request comprises:
    dragging, by the user, a resource indication of the list of resource indications from the first display area to a second display area, the second display area being different from the first display area;
dropping, by the user, the resource indication of the list of resource indications on the second display area; and
determining, by the processor based on the dragging of the resource indication from the first display area and the dropping of the resource indication on the second display area, that the user has selected a resource of the plurality of resources corresponding to the resource indication for inclusion in the UI view.

6. The method of claim 1, further comprising:
generating, by the processor based on the UI configuration, a preview of the UI view; and
displaying, by the processor to the user, the preview of the UI view.

7. The method of claim 1, further comprising:
receiving, by the processor from the user, additional UI configuration information comprising at least one of a resource label, a placeholder text, a suffix label, and a default value; and
adding, by the processor, the additional UI configuration information to the UI configuration.

8. The method of claim 1, further comprising:
receiving, by the processor from the user, a modification request identifying a particular resource of the one or more resources of the plurality of resources included in the UI view;
displaying, by the processor to the user, particular configuration information corresponding to the particular resource;
receiving, by the processor from the user, one or more modifications to the particular configuration information;
updating, by the processor based on the one or more modifications to the particular configuration information from the user, the UI configuration of the UI view, resulting in an updated UI configuration; and
storing, by the processor, the updated UI configuration in the database.

9. An apparatus for rendering a dynamic user interface (UI), wherein the dynamic UI includes a dynamic form to be filled out by a user, the apparatus comprising:
a memory storage storing computer-executable instructions; and
a processor communicatively coupled to the memory storage, wherein the processor is configured to execute the computer-executable instructions and cause the apparatus to:
obtain a plurality of resources of an entity, the plurality of resources comprising parameter-level information;
present the plurality of resources to a user;
receive, from the user and at a second time after a deployment of the dynamic form, wherein the dynamic form is deployed at a first time, at least one request to include one or more resources of the plurality of resources in a UI view, wherein the one or more resources includes an additional requirement for the form added using a drag-and-drop operation;
create, based on the at least one request from the user, a UI configuration of the UI view, the UI configuration comprising view information, in a JavaScript Object Notation (JSON) format, of the one or more resources of the plurality of resources to be included in the UI view;
generate an identifier for the UI view;
associate the identifier of the UI view with the entity, wherein the entity is a work flow;
store the UI configuration in a database;
receive a request to execute the work flow; and
render the dynamic form at a third time of the request, thereby including the additional requirement in the form, wherein the third time is after the second time, and the second time is after the first time.

10. The apparatus of claim 9, wherein the computer-executable instructions, when executed by the processor, further cause the apparatus to:
retrieve the UI configuration from the database, using the identifier of the UI view;
parse one or more JSON fields of the UI configuration; and
render, based on the one or more JSON fields of the UI configuration, the UI view.

11. The apparatus of claim 10, wherein the computer-executable instructions to render the UI view further cause the apparatus to display, to the user, the UI view.

12. The apparatus of claim 10, wherein the computer-executable instructions, when executed by the processor, further cause the apparatus to:
receive, from the user, validation information of a resource of the one or more resources of the plurality of resources included in the UI view; and
add the validation information to the UI configuration of the UI view; and
wherein the computer-executable instructions to render the UI view further cause the apparatus to perform input validation of the resource according to the validation information.

13. The apparatus of claim 9, wherein:
the computer-executable instructions to present the plurality of resources to the user further cause the apparatus to display, to the user in a first display area, a list of resource indications corresponding to the plurality of resources of the entity; and
the computer-executable instructions to receive the at least one request further cause the apparatus to:
drag, by the user, a resource indication of the list of resource indications from the first display area to a second display area, the second display area being different from the first display area;
drop, by the user, the resource indication of the list of resource indications on the second display area; and
determine, based on the dragging of the resource indication from the first display area and the dropping of the resource indication on the second display area, that the user has selected a resource of the plurality of resources corresponding to the resource indication for inclusion in the UI view.

14. The apparatus of claim 9, wherein the computer-executable instructions, when executed by the processor, further cause the apparatus to:
generate, based on the UI configuration, a preview of the UI view; and
display, to the user, the preview of the UI view.

15. The apparatus of claim 9, wherein the computer-executable instructions, when executed by the processor, further cause the apparatus to:
receive, from the user, additional UI configuration information comprising at least one of a resource label, a placeholder text, a suffix label, and a default value; and
add the additional UI configuration information to the UI configuration.

16. The apparatus of claim 9, wherein the computer-executable instructions, when executed by the processor, further cause the apparatus to:
  receive, from the user, a modification request identifying a particular resource of the one or more resources of the plurality of resources included in the UI view;
  display, to the user, particular configuration information corresponding to the particular resource;
  receive, from the user, one or more modifications to the particular configuration information;
  update, based on the one or more modifications to the particular configuration information from the user, the UI configuration of the UI view, resulting in an updated UI configuration; and
  store the updated UI configuration in the database.

17. A non-transitory computer-readable medium comprising computer-executable instructions for rendering a dynamic user interface (UI) by an apparatus, wherein the computer-executable instructions, when executed by at least one processor of the apparatus, cause the apparatus to:
  obtain a plurality of resources of an entity, the plurality of resources comprising parameter-level information;
  present the plurality of resources to a user;
  receive, from the user and at a second time after a deployment of the dynamic form, wherein the dynamic form is deployed at a first time, at least one request to include one or more resources of the plurality of resources in a UI view, wherein the one or more resources includes an additional requirement for the form added using a drag-and-drop operation;
  create, based on the at least one request from the user, a UI configuration of the UI view, the UI configuration comprising view information, in a JavaScript Object Notation (JSON) format, of the one or more resources of the plurality of resources to be included in the UI view;
  generate an identifier for the UI view;
  associate the identifier of the UI view with the entity, wherein the entity is a work flow;
  store the UI configuration in a database;
  receive a request to execute the work flow; and
  render the dynamic form at a third time of the request, thereby including the additional requirement in the form, wherein the third time is after the second time, and the second time is after the first time.

18. The non-transitory computer-readable medium of claim 17, wherein the computer-executable instructions, when executed by the at least one processor, further cause the apparatus to:
  retrieve the UI configuration from the database, using the identifier of the UI view;
  parse one or more JSON fields of the UI configuration; and
  render, based on the one or more JSON fields of the UI configuration, the UI view.

19. The non-transitory computer-readable medium of claim 18, wherein the computer-executable instructions, when executed by the at least one processor, further cause the apparatus to:
  receive, from the user, validation information of a resource of the one or more resources of the plurality of resources included in the UI view; and
  add the validation information to the UI configuration of the UI view; and
  wherein the computer-executable instructions to render the UI view further cause the apparatus to perform input validation of the resource according to the validation information.

20. The non-transitory computer-readable medium of claim 17, wherein:
  the computer-executable instructions to present the plurality of resources to the user further cause the apparatus to display, to the user in a first display area, a list of resource indications corresponding to the plurality of resources of the entity; and
  the computer-executable instructions to receive the at least one request further cause the apparatus to:
  drag, by the user, a resource indication of the list of resource indications from the first display area to a second display area, the second display area being different from the first display area;
  drop, by the user, the resource indication of the list of resource indications on the second display area; and
  determine, based on the dragging of the resource indication from the first display area and the dropping of the resource indication on the second display area, that the user has selected a resource of the plurality of resources corresponding to the resource indication for inclusion in the UI view.

* * * * *